Patented Aug. 20, 1940

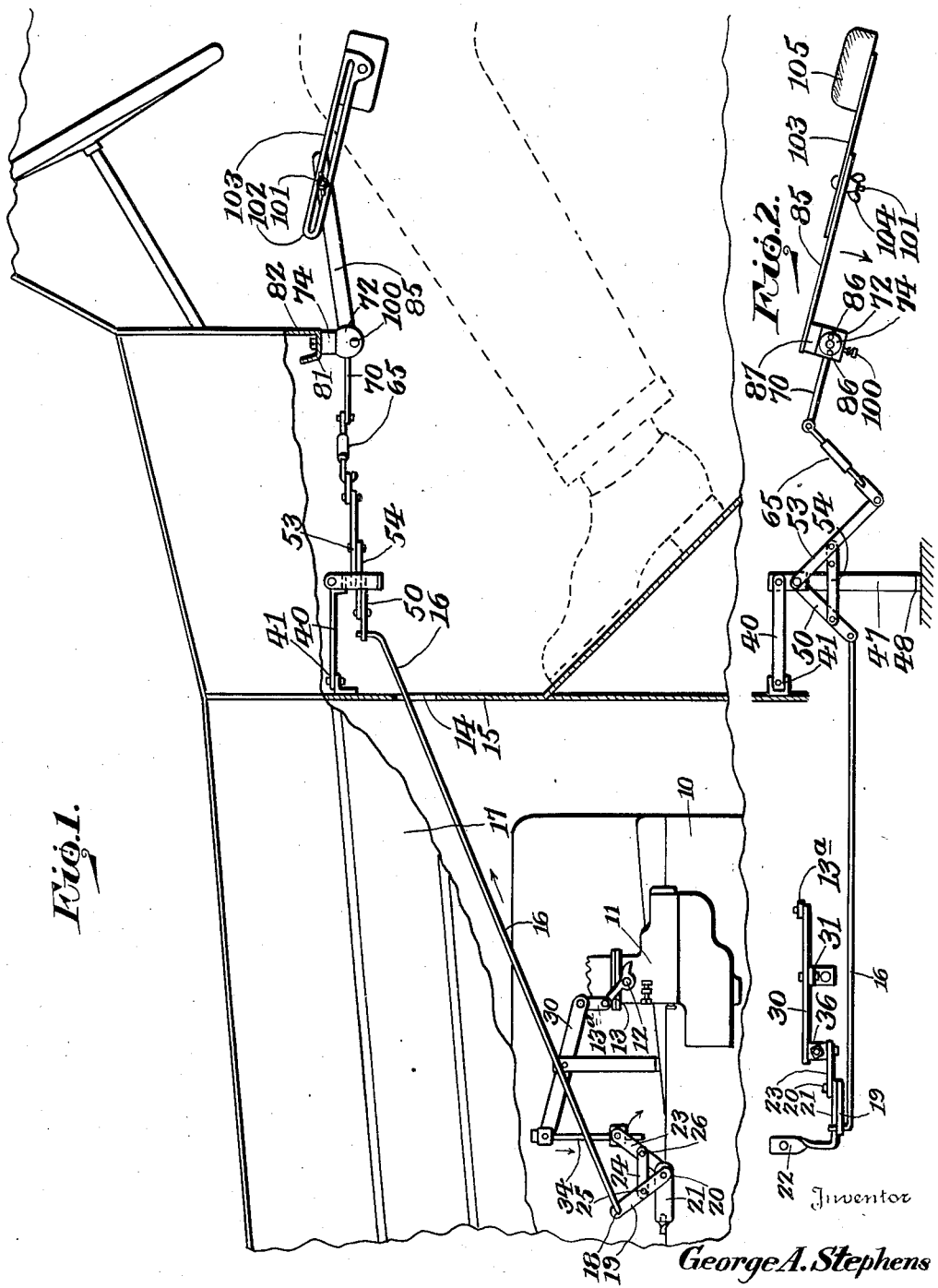

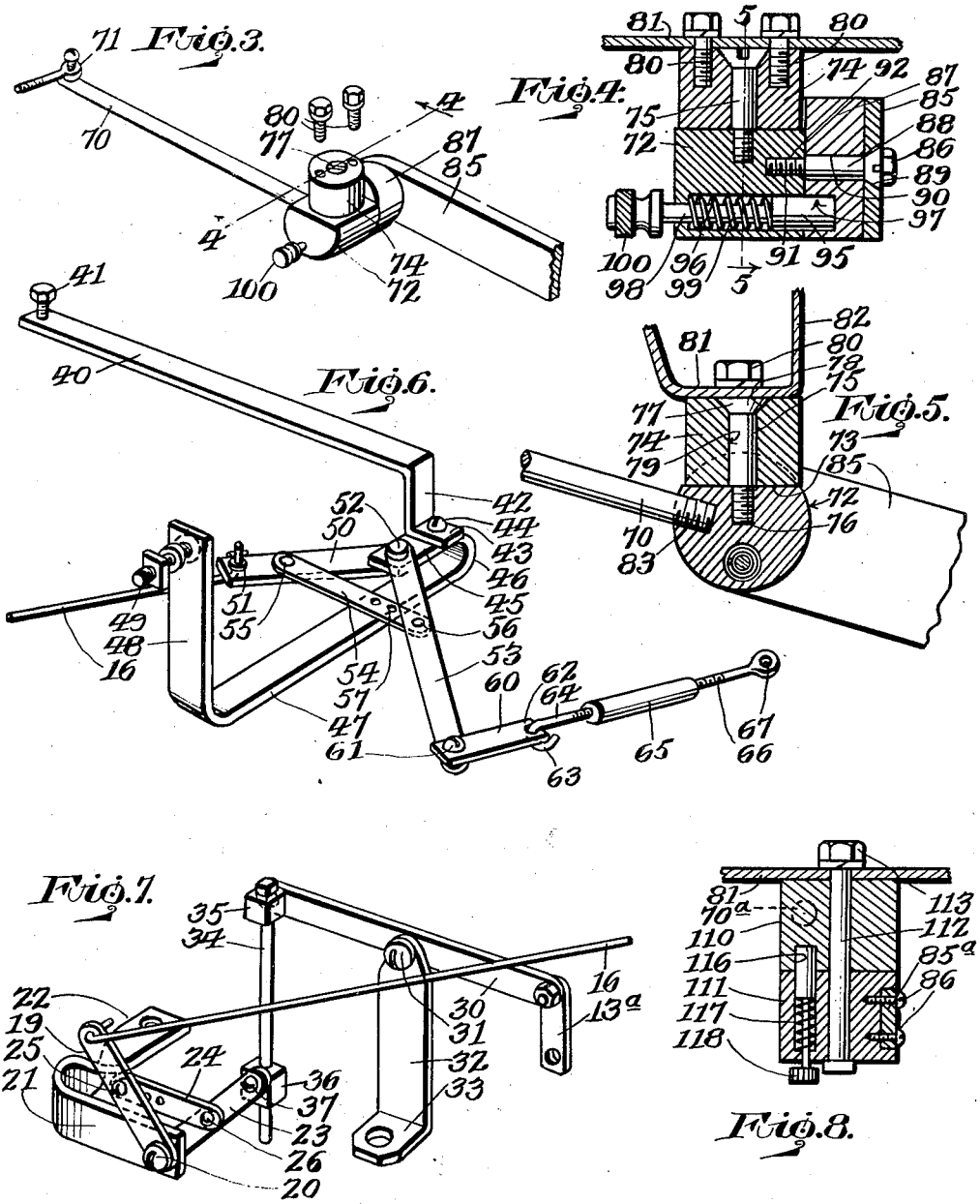

2,212,083

UNITED STATES PATENT OFFICE 2,212,083

ACCELERATOR

George A. Stephens, Flint, Mich.

Application October 25, 1939, Serial No. 301,249

3 Claims. (Cl. 74—515)

This invention relates to an accelerator device for automobiles.

An object of the invention is the provision of a device which may be substituted for the usual foot accelerator pedal, or it may be used as an auxiliary to the foot pedal, so that when the operator of a vehicle becomes cramped or tired from constant operation of the usual accelerator pedal by the foot he may swing the knee operated lever into active position for continued operation of the accelerator by the knee.

Another object of the invention is the provision of a device either as a substitute for the usual foot operated accelerator pedal or as an auxiliary thereto which may be adjusted to accommodate persons of different heights with the auxiliary device being operated by knee pressure instead of the foot, the knee actuated lever being adapted to be moved to an inoperative position when desired or moved into position and automatically locked, the arrangement being such that adjustments may be made at several positions for maintaining the positive operation of the butterfly valve of the carbureter.

A further object of the invention is the provision of a device for operating the butterfly valve of the carbureter by knee pressure in which a lever which is acted on by the knee may be swung to an operative or inoperative position as desired, said lever being rigid with a rotatably mounted barrel on a base member with a spring pressed plunger or detent engaging an opening in the barrel for locking the lever in an operative position.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a side view in elevation of my knee accelerator shown applied to an automobile with parts of the automobile in section.

Figure 2 is a detached plan view of the knee actuated accelerator.

Figure 3 is a fragmentary view in perspective of a lever adapted to be actuated by the knee and some of the connections which extend to the butterfly valve of the accelerator.

Figure 4 is a transverse vertical section taken along the line 4—4 of Figure 3.

Figure 5 is a vertical section taken along the line 5—5 of Figure 4.

Figure 6 is a view in perspective of operating levers and linkage forming part of the device.

Figure 7 is a view in perspective of a combination of links and levers which are adapted to be connected to the accelerator pedal.

Figure 8 is a vertical section of a modified form of the connections where a locking element is employed.

Referring more particularly to the drawings 10 designates an internal combustion engine having a carbureter 11 and a shaft 12 which is connected with the usual butterfly valve (not shown) of the carbureter and from which extends an operating lever 13.

An opening 14 is formed in the cowl 15 of the automobile and through which passes a link 16.

The link extends downwardly beneath the hood 17 and is pivotally connected at 18 to a lever 19 which is pivotally mounted on a bolt 20 at one face of a bracket 21. This bracket has a right angular portion 22 which is connected to the engine 10 by means of the usual bolt that connects the horn bracket to the cylinder block or cylinder head as the case may be.

A lever 23 is pivotally mounted on the bolt 20 at the other face of the bracket 21 and is located at an angle to the lever 19. A brace bar 24 is connected at one end at 25 to the lever 19. The other end of the bar as shown at 26 is connected to the lever 23 intermediate the ends thereof. A lever 30 is pivotally connected at 31 to the upper end of a bracket 32 which has a perforated right angular flange 33 bolted to the cylinder head or to the engine block in any approved manner.

A link 34 has one end connected to a rockably mounted collar 35 which is pivoted on one end of the lever 30. The opposite end of the link 34 is connected to a collar 36 and one end of the lever 23 is pivotally connected at 37 with the collar 36. The collars 35 and 36 may be adjustably positioned along the link 34 in any approved manner. For this purpose the usual set screws may be threaded into openings in the collars for engagement with the link 34.

A bracket 40 is secured at 41 to the inner face of the cowl 15 above the opening 14 and extends inwardly from the cowl towards the driver's seat. The free end of the bracket as shown at 42 is bent downwardly and then outwardly as shown at 43. The bent portion 43 is secured at 44 to an arm 45 of a U-shaped member 46 formed on one end of an L-shaped bracket. The vertically disposed arm 48 of the bracket 47 is secured by means of a bolt 49 to the side of the car.

A lever 50 has one end connected at 51 to the link 16. The other end of the lever is pivotally mounted on a bolt 52 carried by the arm 45 of the bracket 47 and at the under face of said arm. A second lever 53 is pivoted on the bolt 52 at the upper face of the arm. A brace bar 54 has one end connected at 55 to the intermediate portion of the lever 50. The other end of the bar 54 is pivotally connected at 56 with an intermediate portion of the lever 53. It will be noted that the bar 54 is provided with a plurality of perforations 57 which are adapted to receive the bolt or pin 56 for varying the angles between the levers 50 and 53 when desired.

A link 60 has one end pivotally connected at 61 with the free end of the lever 53. The opposite end of the link is provided with a perforation 62 which is adapted to receive an eye 63 formed on a rod 64. A sleeve 65 in the form of a turnbuckle has threaded connections with the rod 64 and with a rod 66 which has an eye 67 at its free end.

A lever 70 is provided with a bolt 71 at its free end which receives the eye 67 of the rod 66. A barrel 72 has a flattened portion 73 from which is mounted a connecting block 74. A pin 75 is threaded into an opening 76 in the barrel 72 and is provided with a head 77 received by a counter sunk portion 78 in the top of the block 74. This pin is received by a passage 79 formed in the block 74 so that the barrel 72 may rotate on the block 74. This block is connected by means of bolts 80 with an inturned flange 81 formed at the lower end of the dash 82. The rod 70, as shown at 83, is threaded into a passage in the barrel 72 and is, therefore rigidly connected to said barrel.

A lever 85 is rigidly connected by means of bolts 86 to a second barrel 87 (Fig. 2.) A bolt 88 has its head 89 counter sunk in the lever 85 and is received by a passage 90 formed axially of the barrel 87. The inner reduced end of the bolt, as shown at 91, is threaded in a passage 92 formed in the barrel 72 whereby the barrel 87 is rotatably mounted on the barrel 72 while the barrel 72 in turn is rotatably mounted on the block 74.

A detent or plunger 95 is mounted in a passage 96 formed in the barrel 72 and this passage is adapted to be alined with a passage 97 formed in the barrel 87 so that the plunger 95 may be projected into the passage 97 for locking the barrel 87 to the barrel 72. The plunger has a reduced portion 98 located in the passage 96 and a coil spring 99 engages a shoulder on the plunger 95 and the inner end of the passage 96. The spring tends to force the plunger 95 outwardly of the barrel 72 at all times. A knurled knob 100 is connected to the reduced end 98 of the plunger 95 so that the plunger may be manually withdrawn to remove the inner end of the plunger 95 from the passage or pocket 97 in the barrel 87 for a purpose which will be presently explained.

As shown more particularly in Figures 1 and 2 a bolt 101 is carried by a perforation in the outer free end of the lever 85 and passes through a slot 102 formed in an arm 103. A wing nut 104 which is threaded onto the bolt 101 securely locks the arm 103 in any angular position desired. A pad 105 is secured to the outer end of the arm 103 in any approved manner and is adapted to be engaged by the knee of the operator for oscillating the arm.

A modified form of the arrangement shown in Figures 4 and 5 is disclosed in Figure 8 in which two barrels 110 and 111 are rotatably connected together by means of a pivot pin or bolt 112. A nut 113 on the upper end of the bolt 112 is adapted to clamp the barrel 110 to the flange 81 on the lower end of the dash 82 of the vehicle. In this case the lever 85ª is secured at 86 to the barrel 111 and extends in the same direction as the lever 85 and is provided with a knee pad and an adjustment for the arm 103 similar to the construction shown in Figures 1 and 2.

A plunger or detent 115 has one end projecting into the pocket 116 in the barrel 110 for locking the barrel 111 to the barrel 110. The spring 117 urges the detent 115 outwardly against manual operation of the detent by a knurled knob 118. A rod 70ª similar to the rod 70 in Figure 3 is secured to the barrel 110 so that when the detent 115 has locked the barrels 110 and 111 together and the lever 85ª is oscillated in a horizontal plane the rod 70ª will likewise be rocked.

The operation of my device is as follows: The lever 85 and connected arm 103 may be operated for operating the throttle of the carburetor 11 in place of the usual accelerator pedal, and in this case the accelerator pedal may be dispensed with or the arm 85 may be operated alternately with the usual accelerator pedal.

When the arm 85 is rocked in the direction indicated by the arrow in Figure 2 the levers 50 and 53 will be rocked through the arm 70 and the turnbuckle connection 65. Rocking of the lever 50 will cause the link 16 to oscillate the connected levers 19 and 23 in the direction indicated by the arrow in Figure 1 whereby the link 34 will be moved downwardly so that the lever 30 will be rocked to pull upwardly on the lever 13 which is pivotally connected to one end of the lever 30 by means of a link 13ª and thus open the throttle valve of the carbureter. Springs, not shown, are employed for returning the elements just described to their normal inoperative position when the arm 103 is released by the knee of the operator.

When it is desired to dispense with the operation of the arm 103 for operating the throttle valve of the carbureter and it is desired to operate the usual accelerator pedal the plunger 95 or the plunger 115, as the case may be, is withdrawn so that the lever 85 or 85ª may be swung to an inoperative position whereby the arm 103 will be moved out of operative relation with the knee of the operator of the car.

When it is desired to return to the knee operating device the lever 85 is then pulled up into position when the plunger 95 or the plunger 115 will automatically slip into their respective pockets in the associated barrels when the pockets are lined with the passage 96 in the barrel 72 as the pocket 116 in the member 110.

I claim:

1. A device for actuating the throttle valve of a carbureter in an automobile comprising a block secured to a fixed part of the automobile, a barrel, means rotatably mounting the barrel on the block, a second barrel, means rotatably mounting the second barrel on the first barrel so that the second barrel will be revolved in a plane which is at right angles to the plane of rotation of the first barrel, an arm having one end secured to the second barrel, the free end of the arm adapted to be engaged by the knee of a person, a rod rigid with the first barrel and projecting therefrom, a pair of levers angularly disposed and having at the inner ends thereof, a common pivot, a bar connecting the intermediate portions of the levers together, means adjustably connecting the bar to one of the levers for varying the angular displacement of the levers, means connecting the rod with the outer end of the last-mentioned lever, means connecting the throttle valve with the other lever, and means releasably connecting the two barrels together.

2. A device for actuating the throttle valve of a carbureter in an automobile comprising a block having a bearing surface and secured to a fixed part of the automobile, a barrel having a portion cut away to provide a flat surface engaging the bearing surface on the block, means having a vertical axis for rotatably mounting the barrel on the block, a barrel having one face contacting one end of the first barrel, means rotatably connecting the barrels together along the horizontal axis of the second barrel, means releasably locking the barrels together, a knee-actuated arm secured to the second barrel, and means operatively connecting the first barrel with the throttle valve.

3. A device for actuating the throttle valve of a carbureter in an automobile comprising a block having a bearing surface and secured to a fixed part of the automobile, a barrel having a portion cut away to provide a flat surface engaging the bearing surface on the block, means having a vertical axis for rotatably mounting the barrel on the block, a barrel having one face contacting one end of the first barrel, means rotatably connecting the barrels together along the horizontal axis of the second barrel, a knee-actuated arm secured to the second barrel, a releasable means for locking the barrels together, said means when released permitting the arm to be moved to an inoperative position, a rod rigid at one end with the first barrel, and means operatively connecting the other end of the rod with the throttle valve.

GEORGE A. STEPHENS.